United States Patent [19]

Yan

[11] 4,451,130
[45] May 29, 1984

[54] DISC CAMERA WITH HANDLE GRIP COVER

[75] Inventor: Chan K. Yan, North Point, Hong Kong

[73] Assignee: W. Haking Enterprises Limited, Hong Kong, Hong Kong

[21] Appl. No.: 385,328

[22] Filed: Jun. 4, 1982

[51] Int. Cl.³ ............................................. G03B 17/00
[52] U.S. Cl. ...................................... 354/82; 354/121; 354/268
[58] Field of Search ................... 354/81, 82, 293, 121, 354/268; 352/243

[56] References Cited

U.S. PATENT DOCUMENTS 3,588,239  6/1971  Hochstein .......................... 354/82 X
4,050,796  9/1977  Komine .............................. 354/80 X
4,075,642  2/1978  Niggeloh ............................... 354/82

FOREIGN PATENT DOCUMENTS 644612  5/1937  Fed. Rep. of Germany ...... 354/268
2038008  7/1980  United Kingdom .

Primary Examiner—John Gonzales

Attorney, Agent, or Firm—Wallenstein, Wagner, Hattis, Strampel & Aubel

[57] ABSTRACT

In a camera adapted to receive a disc-shaped magazine and including a housing with front and rear walls having a lens window exposed on the front wall near one side margin of the housing and front and rear viewfinder windows exposed on the front and rear walls on the same side of the housing as the lens window, a hollow handle is provided having spaced front and rear walls defining therebetween an open housing side-receiving recess. The handle is much narrower than the width of the housing so as to fit over only the side of the housing containing the lens and viewfinder windows. The handle is mounted on the housing for movement between a stable, releasable retracted position where the handle recess receives the latter side of the housing therein so that the front and rear handle walls cover the lens, and front and rear viewfinder windows, and at least one stable, releasable extended position where the handle projects downwardly and laterally outwardly where it can be readily grasped by the hand corresponding to the side of the camera where the lens window is located, so that the user cannot conveniently grasp the adjacent side of the housing inadvertently to cover the lens window near the margin thereof.

9 Claims, 8 Drawing Figures

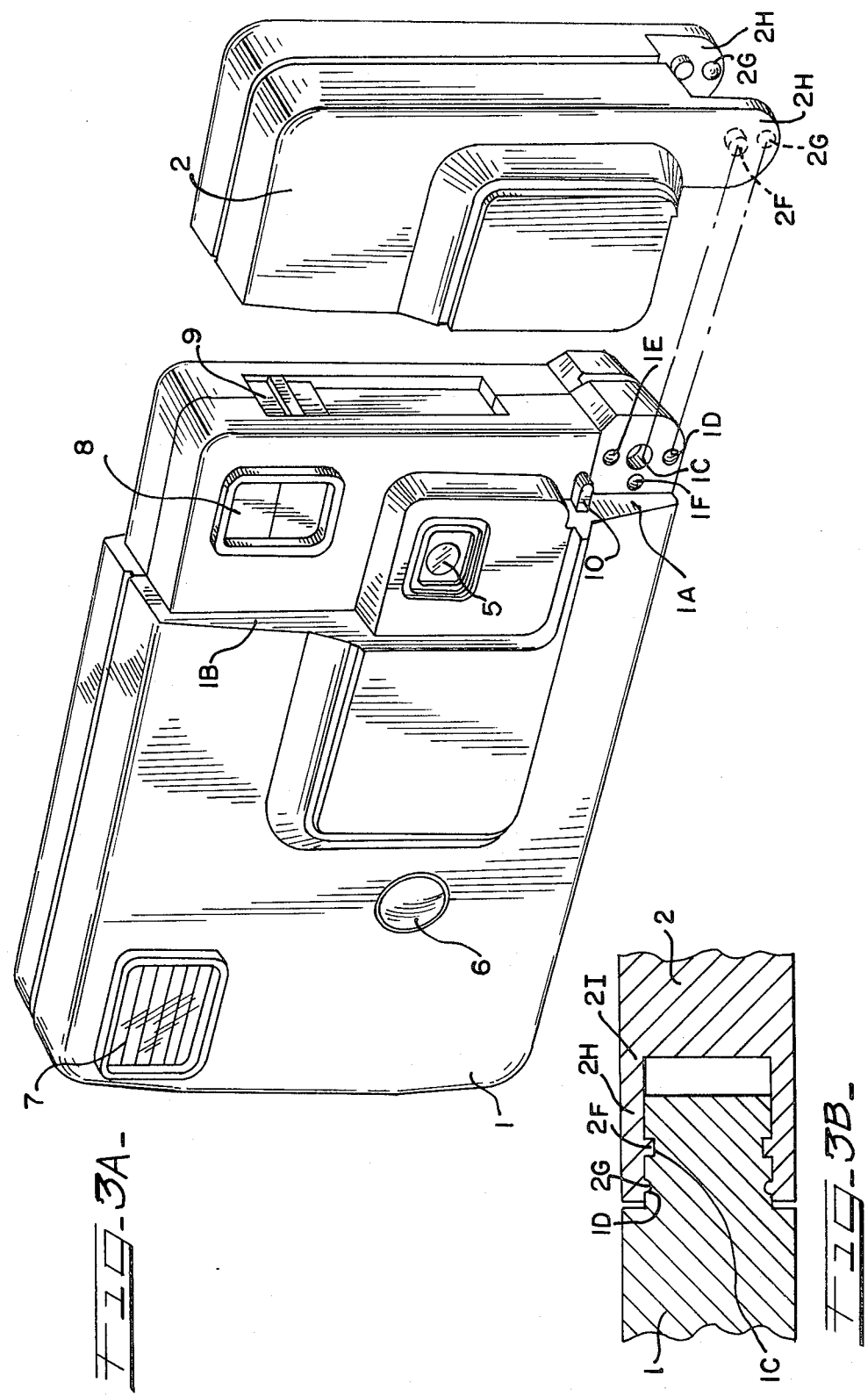

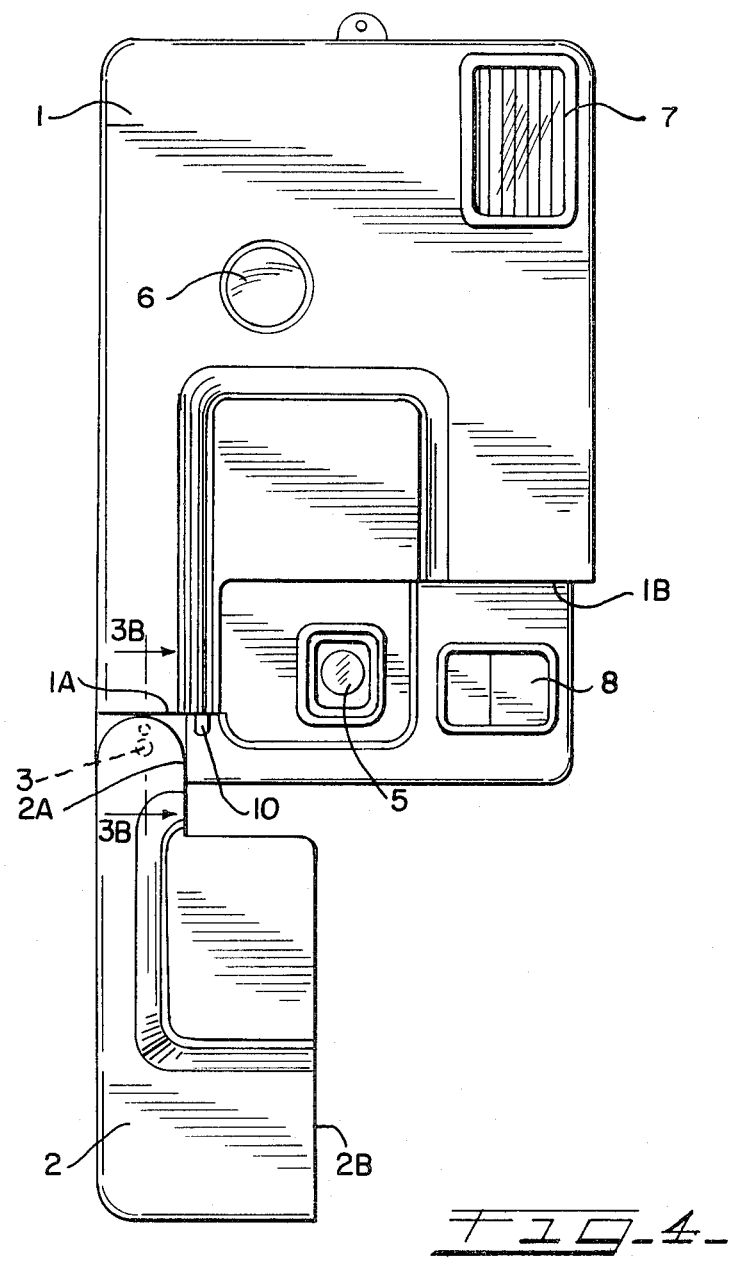
FIG_4

DISC CAMERA WITH HANDLE GRIP COVER

BACKGROUND PRIOR ART

The present invention relates to still cameras, and more particularly, to still cameras of the type which receive a disc-shaped film magazine referred to in the art as disc cameras. In such a magazine, the magazine includes a circular film member, which, when the magazine is placed in the camera housing in a vertical plane parallel to the vertical front wall of the camera housing, is rotatable about a horizontal axis in the magazine. The film frame to be exposed is in a position to the left of the axis of rotation of the film member as viewed by the user. In camera housings designed to receive such a magazine, to avoid pink-eye effects a built-in flash unit is positioned on the far right hand of the camera housing. To provide a camera housing of minimum width, this will place the lens of the camera, which must be in line with the film frame brought to an exposable position to the left of the axis of rotation of the film member of the magazine, near the left side edge of the camera housing. If the user should grip such a camera housing in the usual way used to grip cameras of more conventional design, where the user cups his right and left hands around the sides of the camera, the user's left hand, unknown to the new camera user, is in a position to cover the camera lens, which will obviously prevent the taking of a satisfactory picture.

In an effort to avoid the problem of the left hand being in a position where it covers over the lens of a disc camera, Eastman Kodak in its more expensive version thereof provides a thin cover forming a combination cover and handle which extends the full width and height of the camera housing. The cover is pivotally mounted at the bottom of the camera for movement between a raised position where it covers over the entire front face of the camera to a lowered position where it can be grasped by the left and/or right hand of the user, if the user cares to do so. The cover, however, does not appear as a handle and is so thin as not to comfortably fill the user's hand. In operating a disc camera, it is most convenient to operate the camera with the right hand cupped around the right side of the camera housing and with the left hand gripping a handle-forming member. This Eastman Kodak cover-handle design, which extends the full width of the housing, does not suggest such a different placement of the left and right hands. Also the cover does not cover the rear window of the viewfinder, since the cover extends only over the front of the camera housing.

SUMMARY OF THE INVENTION

In accordance with one of the features of the present invention, a camera handle is provided which is uniquely designed and related to the camera housing so that when it is in its extended position it is in a position only to be gripped by the user's left hand, so that the user is forced to place his right hand in the most convenient housing gripping position where it is cupped around the right side of the camera. A related specific feature of this aspect of the invention is that the handle of the camera in its extended position is so related to the camera housing that the user would automatically grip the handle rather than the left side of the camera housing, which he cannot conveniently grip because of the placement of the handle in a position projecting both laterally outwardly as well as laterally downwardly from the left side of the camera housing.

In accordance with another feature of the invention, the walls of the handle, which preferably are retracted over only the left side of the cover housing, are made relatively thin so as to add very little bulk to the camera housing. The housing surfaces on the left side of the camera housing are preferably recessed from the adjacent housing surfaces so that the outer surfaces of the handle in its retracted position are flush with and form a continuation of the adjacent surfaces of the camera housing.

In accordance with still another feature of the invention, the handle has a hollow or shell-like construction which comfortably fills the user's hand when gripped and defines a recess or cavity which receives only the left side of the camera housing when moved to its retracted position. In such position it preferably acts as a cover for both the camera lens window and the front and rear windows of the viewfinder, which is most advantageously positioned above the camera lens window.

In accordance with a still further feature of the invention, when the handle is moved to its retracted position it covers the door release member, which is operated to open the rear door of the camera housing to permit removal of the disc magazine from or insertion of the disc magazine into the housing.

In accordance with a still further feature of the invention, the handle is movable into a position intermediate its fully extended and fully retracted positions, in which intermediate position the camera is conveniently held for vertical orientation of the film picture format.

In another feature of the invention, when the handle is moved to its retracted position, it activates a movable element which locks the shutter release mechanism against accidental actuation. In a preferred related feature of the invention, movement of the handle to its retracted position actuates a movable element to disconnect a camera battery from its load circuitry to prevent battery rundown.

The above and other features of the invention will become apparent upon making reference to follow the drawings and the claims.

DESCRIPTION OF DRAWINGS

FIG. 3A is an exploded perspective view of the camera housing and handle-cover, showing details of a handle-cover hinge with locking detents;

FIG. 3B is a partial cross-sectional view through the axis of the hinge with the handle-cover closed;

FIG. 4 is a front elevational view of the camera with the handle-cover opened to an intermediate position.

DETAILED DESCRIPTION OF THE INVENTION

Figure 1:
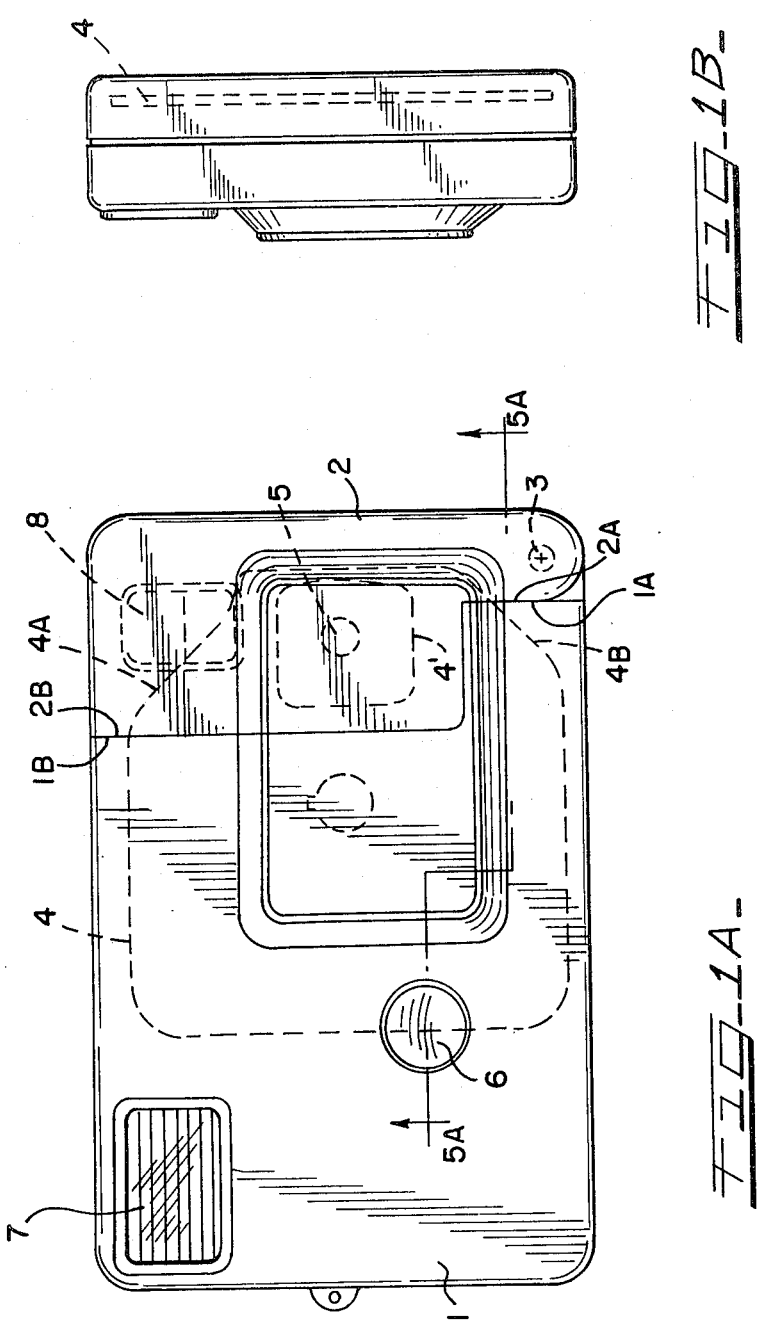
FIGS. 1A and 1B are a front and side elevation view respectively of a camera for disc film with a pivotally attached handle-cover in its closed or retracted position.

FIGS. 1A and 1B show front and side elevations of the exemplary form of the invention as applied to a disc-film camera. The camera is composed of a main body or housing 1 and a handle fashioned in the form of a cover 2 which is hinged about an axis 3 extending through the lower right hand corner of the camera. The camera main body or housing 1 is constructed such that the front and rear surfaces have the relatively largest area, and a section perpendicular to these surfaces is relatively thin. This is a direct consequence of the geometry of disc-film cartridges.

A disc-film cartridge 4, as shown in dotted outline in FIGS. 1A and 1B, is placed inside the camera 1 in a position close to the right and back sides of the camera. The disc-film cartridge 4 is so oriented that the picture area 4' is on the right as viewed in FIG. 1A (but on the left as viewed from the user's perspective). A picture-taking lens 5, also shown in dotted outline in FIGS. 1A and 1B, is also close to the left side of the camera as seen by the user. The axis of the picture taking lens 5 is perpendicular to the front surface of the camera 1. The disc film cartridge 4 has two slant corners 4A and 4B. The space in the camera that is left over by the top slant corner 4A is utilized to house a viewfinder 8. The space that is left over by the bottom slant corner 4B is utilized to provide attachment means for the handle 2. The handle 2 in its closed position covers both the camera lens 5 and the front and rear viewfinder windows 8.

Figure 2:
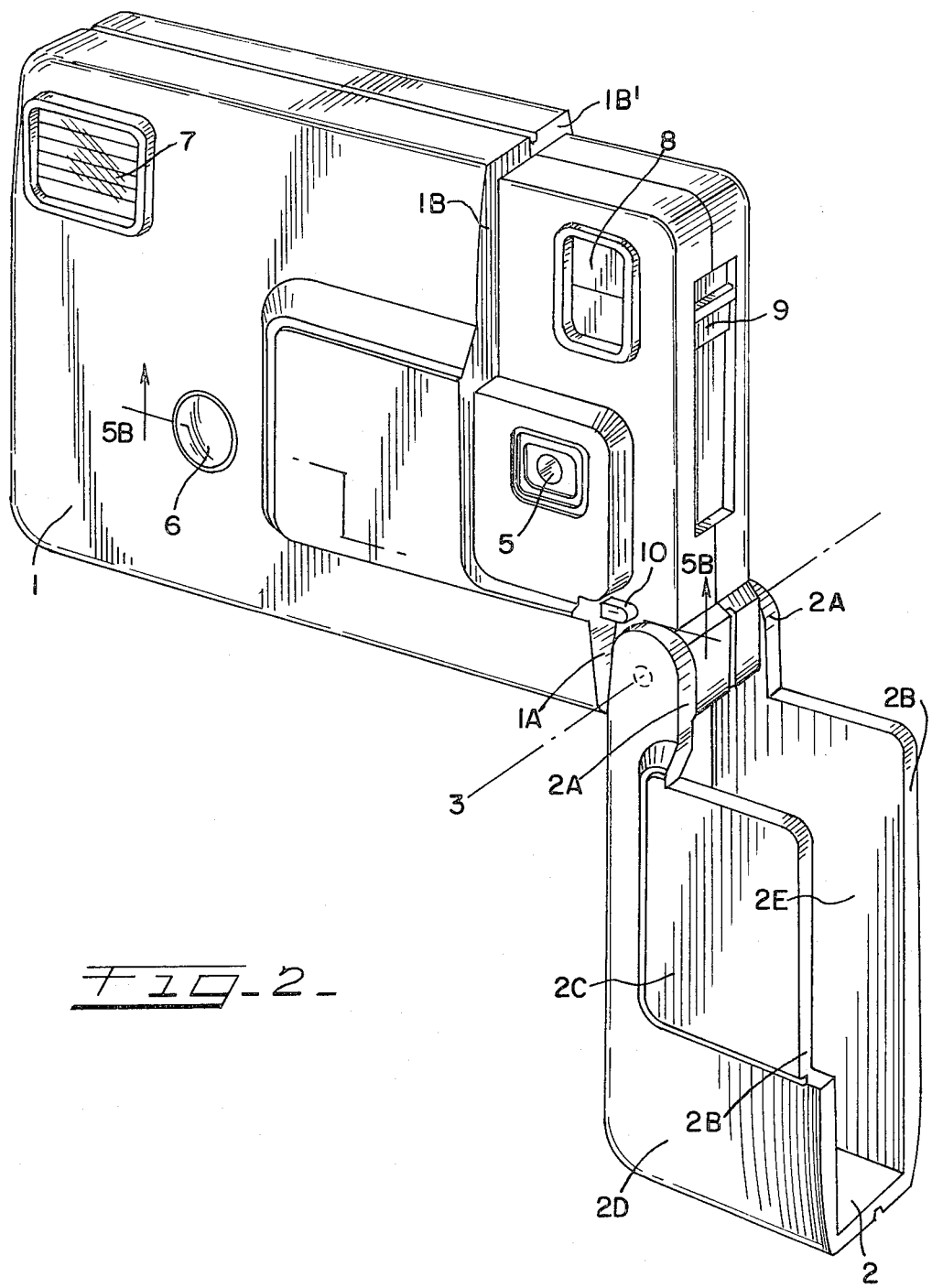
FIG. 2 is a perspective view of the camera with the handle-cover fully extended to serve as a hand grip for the user's left hand.

FIGS. 2 and 3 show the camera with the handle 2 fully extended. Both the picture-taking lens 5 and the front and rear viewfinder windows 8 are now exposed. A latch actuator 9 for a film compartment door in the camera (not shown, and of conventional design) also becomes exposed such that it is excessible to the user to release a door latch (not shown) to permit a rear door on the camera housing to be opened to load and unload film. The handle 2 is a thin shell which has a generally U-shaped cross section providing a recess or cavity 2E between spaced side walls for receiving the left side of the camera housing. When the handle 2 is closed, narrow side wall faces 2A and 2B on the front and rear handle side walls come into contact with the narrow faces 1A and 1B respectively on the front and rear of the housing 1, as shown in FIG. 1A. The outer surfaces of the left side of the camera housing are recessed inwardly by the wall thickness of the handle so that in its closed position, its outer surfaces are flush with the adjacent outer surfaces of the camera housing.

The front side wall portion 2C of the handle 2 covers the picture taking lens 5 when the handle is in its closed position. Side wall portions 2D and 2E of the handle then also cover the front and rear windows 8 of the viewfinder. It will also be noted that, whereas the picture-taking lens 5 and the viewfinder 8 are completely shielded from dust when the hand grip 2 is in the closed position, a shutter release button 6 and a built-in flash 7 remain exposed.

Also shown in FIG. 2 is a depressible on-off control member 10 which projects from the interior of the housing 1 to extend beyond front face 1A thereof when the handle 2 is opened. When the handle 2 is closed, front side wall face 2A thereof engages the end of control member 10 to force it back into the housing 1. This acts and serves to actuate certain camera controls to a safety configuration, as will be subsequently discussed.

The handle 2 is preferably sufficiently large to serve as a convenient hand grip when deployed to its opened or extended position. Also, because of its thin-walled construction, it adds very little overall bulk to the camera when it is in its closed position. Also, in its fully extended position it projects both laterally outward and downward from the camera housing where it is in a position where the user would most assuredly grip it with his or her left hand.

FIG. 3A shows details of the pivotal attachment of the handle 2 to the housing 1. On the lower right corner of the housing 1, there is a cylindrical recess 1C which engages a cylindrical boss 2F on an extension 2H of the handle 2. A similar engagement (not shown) is provided at the rear of the camera. These elements engage to form a hinge above which the handle 2 pivots between its closed and opened positions.

Located around the cylindrical recess 1C are three spherical dimples 1D, 1E and 1F disposed on a radius centered about circular recess 1C. Correspondingly, there is a hemispherical boss 2G on extension 2H on the handle 2. The distance between the centers of the bosses 2F and 2G is the same as the radius on which dimples 1D, 1E and 1F are disposed. Again, a similar arrangement exists at the back side of the camera.

FIG. 3B is a partial cross section view of a portion of the camera of the housing 1 and the handle 2 in the region of the hinge assembly. Cover extensions 2H are sufficiently resilient that positive locking pressure is applied to force the bosses 2G into detents 1D, 1E and 1F as the handle 2 is rotated, thereby providing a three position locking engagement characterized by a threshold level of force, which, if applied to the handle will disengage the bosses 2E from the detent in which they are engaged to allow the cover 2 to be rotated to one of the two remaining stable locking positions. Additionally, in either the closed or fully opened positions, the handle 2 is further held stable by the limiting contact between faces 1A and 2A in the closed position shown in FIG. 1A, and between face 1A and the outer wall of the handle 2 in the fully extended position as shown in FIG. 2.

Figure 5B:
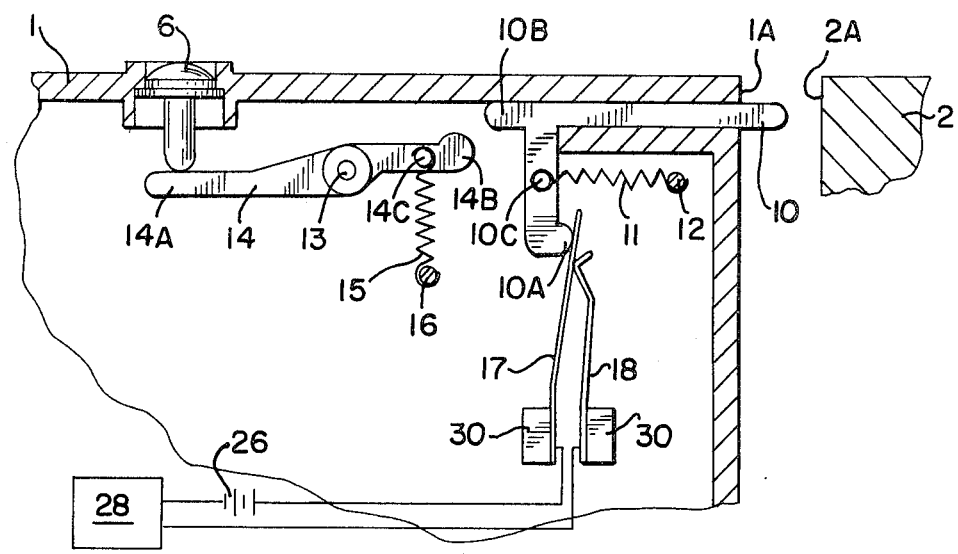
FIGS. 5A and 5B are partial cross sectional bottom views of the camera, showing the displacement of a movable actuating member by cover closure to disable a shutter release and open a power switch.
Figure 5A:
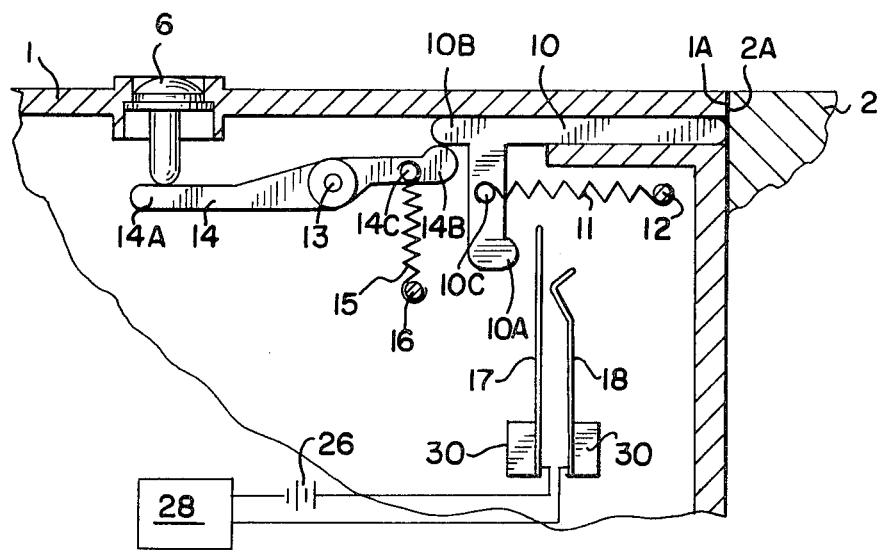

FIGS. 2 and 4 show the handle 2 in its fully opened and half opened positions respectively. As previously indicated, in its fully opened position the handle 2 can be gripped by the left hand of the user and held in an orientation such that a picture of horizontal format is taken. In its half opened position, the handle 2 can be gripped by the left hand of the user and held in an orientation such that a picture of vertical format is taken. The shutter button release 6 is always operated by the right hand of the user. FIGS. 5A and 5B show interior details of the on-off control member 10 and related mechanisms which respond to the closing and opening of the handle 2. Both figures are cross sectional views looking upward at the bottom of the camera, the section being in the immediate vicinity of the actuating member 10. In FIG. 5A the handle 2 is shown closed with the faces 1A and 2A in contact. The on-off control member 10 is thus forced inward against the force of a restraining spring 11 anchored at one end to an interior element 12 which is secured to the housing 1, the other end of the spring engaging a boss 10C mounted on an extension arm 10A of the control member. With respect to perspective view of FIG. 2, the control member 10 is forced generally to the left by closure of the handle 2. FIG. 5B shows control member 10 urged to project outwardly of the housing 1 as the handle 2 is moved slightly towards a deployed position, the spring 11 urging the control member to extend outward from the body 1. Related control elements actuated by the control member 10 consist of resilient switch contacts 17 and 18 mounted on insulating mounts 30—30 affixed to housing 1, the switch elements in turn being connected in series with a battery 26 to control the flow of battery power to associated control circuitry 28, here shown functionally, and which may involve such typical battery powered on-board camera circuits as photosensors, electric motor film drives, and other electrical control circuitry of types well known in the electric camera art.

With the handle 2 at least partially deployed, as shown in FIG. 5B, the control member 10 is urged outward by the spring 11 to force extension element 10A of the control member to force the switch element 17 into contact with the switch element 18, thereby closing the circuit supplying power to the control circuit 28. With the handle closed, as shown in FIG. 5B, extension member 10a is moved to the left, and the natural resilient action of switch member 17 breaks the contact with element 18 to disconnect the battery 26 from the control circuitry 28.

Actuation of the shutter mechanism by depression of the shutter button 6 is mechanically disabled by inward motion of the control member 10 when the handle 2 is moved to the closed position shown in FIG. 5A. A first element 14 of the shutter mechanism (remaining elments not shown) is rotatably mounted about a spindle 13 affixed to the housing 1, and at its other end to boss 14C on the shutter actuation member 14. The spring tension forces an engaging arm 14A of member 14 clockwise into contact with the shutter release button 6. Depression of the shutter release button 6 then causes member 14 to move in a counterclockwise direction to actuate the remaining linkages of the shutter release mechanism (not shown). With the control member 10 forced inward upon closure of the handle 2, as shown in FIG. 5A, extension 10b of member 10 is moved to be interposed to engage extension 14B of member 14 and prevent such rotation. The result is that with the control member 10 pushed inward, the shutter actuating member 14 is frozen against counterclockwise rotation, with the result that the shutter button 6 cannot be depressed to rotate member 14 to actuate the shutter. By these two mechanisms, closure of the handle 2 disconnects the battery from control circuitry, thereby promoting battery life, and effectively disables the shutter release button 6, thereby preventing accidental actuation of the shutter and wastage of film.

Thus, there has been described a combination handle and camera cover which in the storage configuration protects all camera optics. Additionally, on-board electrical power circuitry is automatically disconnected, and the shutter is disabled to prevent accidental film wastage. The handle grip is so dimensioned to provide a left hand grasping surface in its extended condition only, while at the same time, owing to its configuration as a thin shell, provides an adequate gripping surface without materially contributing to the bulk of the camera.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the invention, but that the invention will include all embodiments falling within the scope of the appended claims.

I claim:

1. In a camera configured to receive a disc-shaped magazine and including a housing with front and rear walls having a lens window exposed on said front wall near one side margin of the housing and front and rear viewfinder windows exposed on the front and rear walls on the same side of said housing as the lens window, the improvement comprising a hollow handle for said housing and having spaced front and rear walls defining therebetween an open housing side-receiving recess, said handle being much narrower than the width of said housing so as to fit over only the side of said housing containing said lens and viewfinder windows, and attachment means mounting said handle to said housing for supporting the same for movement between a stable, releasable retracted position where said handle recess receives the latter side of said housing therein and where said front and rear handle walls cover said lens and front and rear viewfinder windows, and at least one stable, releasable extended position where said handle can be readily grasped by the hand corresponding to the side of the camera where said lens window is located, so that the user need not grasp the adjacent side of the housing inadvertently to cover the lens window near the margin thereof.

2. The camera of claim 1 wherein said handle is a thin-walled shell, and said front and rear walls of said housing covered by said handle are recessed from the adjacent surfaces of the housing by about the thickness of the walls of the handle, so that the outer surfaces of the handle are flush with the adjacent surfaces of the housing.

3. The camera of claim 1 wherein said attachment means includes releasable locking means for said handle which includes threshold force engaging means producing a locking action between said handle and said housing when said handle is disposed in said retracted position and in said at least one extended position, and for releasably disengaging the same so as to allow substantially free movement of said handle at intermediate positions thereof when a force above a given threshold value is applied.

4. The camera of claim 1 wherein said attachment means includes hinge means pivotally joining said handle to said cover, said hinge means having its axis of rotation disposed perpendicular to said front and rear walls and proximate to the lower cover of said one side margin of said housing, so that said handle is moved from said retracted position to said at least one extended position by rotational motion about said axis.

5. In a camera configured to receive a disc-shaped magazine and including a housing with front and rear walls having a picture-taking lens window exposed on said front wall near one side margin of the housing, a handle for said housing, and attachment means for mounting said handle at a point proximate to said one side margin to said housing for supporting the same for movement between a stable, releasable retracted position and a first stable releasable extended position where said handle can be readily grasped by the hand corresponding to the side of the camera where said lens window is located so that the user need not grasp the adjacent sides of the housing inadvertently to cover the lens window near the margin thereof and so that the camera is oriented to provide a horizontally elongated framing format on the exposed film, the improvement wherein said attachment means also supports said handle for movement only to one additional or second extended stable releasable position where the handle is grasped so that the camera is oriented to provide a vertically elongated framing format on the exposed film, said attachment means including releasable locking means for said handle which includes threshold force engaging means producing a locking action between said handle and said housing by automatic snap-in action between portions of said handle means and portions of said housing when said handle is disposed in said retracted position and in said extended positions, and for releasably disengaging the same so as to allow substantially free movement of said handle at intermediate positions thereof when a force above a given threshold value is applied.

6. In a camera configured to receive a disc-shaped magazine and including a housing with widely spaced apart upper and lower walls which cannot be readily grasped to hold said camera and closely spaced front and rear walls which can be readily grasped, said camera having a picture-taking lens window exposed on said front wall near one side margin of the housing, a handle for said housing, and attachment means mounting said handle to said housing proximate to said one side margin for supporting the same for movement between a stable, releasable retracted position and at least one stable, releasable extended position where said handle can be readily grasped by the hand corresponding to the side of the camera where said lens window is located, so that the user need not grasp the adjacent side of the housing inadvertently to cover the lens window near the margin thereof, said housing further including a manually actuated externally accessible releasable door latch actuator which normally latches a rear magazine compartment closure door, the improvement wherein said handle is located and configured to cover said door latch actuator in said retracted position thereof and to uncover the same in said at least one extended position.

7. In a camera configured to recieve a disc-shaped magazine and including a housing with front and rear walls and having a lens window exposed on said front wall near one side margin of the housing, a handle for said housing, and attachment means mounting said handle to said housing for supporting the same for movement between a stable, releasable retracted position and at least one stable, releasable extended position where said handle can be readily grasped by the hand corresponding to the side of the camera where said lens window is located, so that the user need not grasp the adjacent side of the housing inadvertently to cover the lens window near the margin thereof, said housing further including shutter release disabling means for preventing actuation of said shutter, the improvement wherein said handle is configured and located to actuate said disabling means when in said retracted position to prevent operation of the shutter only when said handle is in said retracted position.

8. The camera of claims 1, 5, 6, or 7 wherein said housing further includes shutter release disabling means for preventing actuation of said shutter, and said handle is configured and located to actuate said disabling means when in said retracted position to prevent operation of the shutter only when said handle is in said retracted position.

9. The camera of claims 1, 5, 6, or 7 wherein said housing further includes electrical control circuitry powered by a source of electrical power, and power switch means interposed between said power source and said circuitry, and said handle is configured and located to operate said switch actuating means to a circuit breaking condition when said handle is in said retracted position and to a circuit making condition when said handle is in said at least one extended position, so that said power source is disconnected from said circuitry when said handle is in said retracted position and said power source is connected to supply power to said circuitry when said handle is in said at least one extended position.

* * * * *

UNITED STATES PATENT AND TRADEMARK OFFICE
CERTIFICATE OF CORRECTION

PATENT NO. : 4,451,130

DATED : May 29, 1984

INVENTOR(S) : Kwok Yan Chan

It is certified that error appears in the above-identified patent and that said Letters Patent are hereby corrected as shown below:

Replace claim 7, column 8, lines 3-21 with the following claim:

7. In a camera configured to receive a disc-shaped magazine and including a housing with widely spaced apart upper and lower walls which cannot be readily grasped to hold said camera and closely spaced front and rear walls which can be readily grasped, said camera having a picture-taking lens exposed on said front wall near one side margin of said housing, the improvement comprising a handle on said housing, said handle forming a relatively narrow gripping handle so that only the hand of the user which would otherwise grasp said one side margin of said housing adjacent to which said lens is located can conveniently grip the same, and means for pivotally attaching said handle to said housing for supporting said handle for movement thereon between a stable, releasable retracted position

UNITED STATES PATENT AND TRADEMARK OFFICE
CERTIFICATE OF CORRECTION

PATENT NO. : 4,451,130
DATED : May 29, 1984
INVENTOR(S) : Kwok Yan Chan

It is certified that error appears in the above-identified patent and that said Letters Patent are hereby corrected as shown below:

>   with respect to said housing and at least one
>   stable releasable extended position where said
>   handle both depends from said housing generally
>   from said one side margin and projects laterally
>   outwardly thereof, so that said hand cannot
>   conveniently grasp said one side margin of said
>   housing and so that the user will more likely
>   grasp the handle rather than said one side margin
>   of said housing with said hand.

*Signed and Sealed this*

*Fourteenth* Day of *May 1985*

[SEAL]

*Attest:*

DONALD J. QUIGG

*Attesting Officer*  *Acting Commissioner of Patents and Trademarks*